Oct. 20, 1925.
C. G. KALLENSEE
1,557,846
PRECISION GAUGE, FLEXIBLE TYPE
Filed May 29, 1923
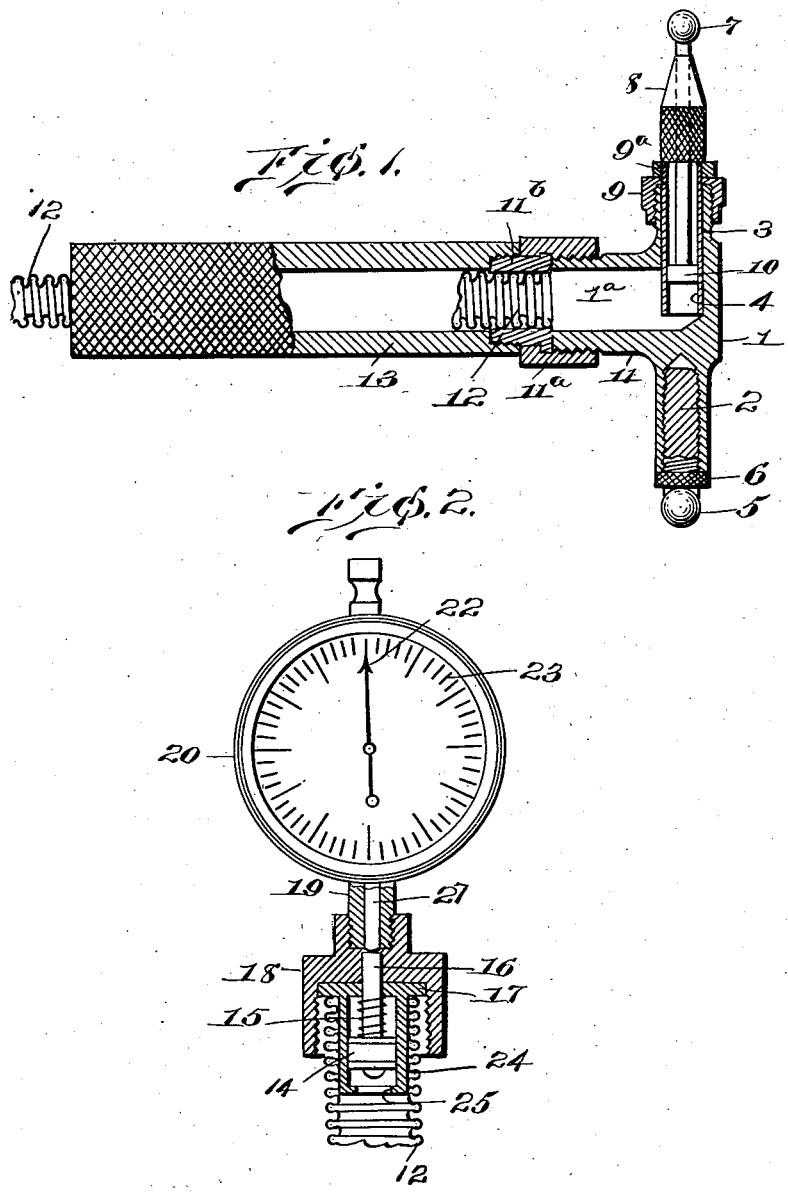
Inventor
C. G. Kallensee
By Robert H Young
Attorney Patented Oct. 20, 1925.

1,557,846

UNITED STATES PATENT OFFICE.

CHARLES G. KALLENSEE, OF DAYTON, OHIO.

PRECISION GAUGE, FLEXIBLE TYPE.

Application filed May 29, 1923. Serial No. 642,225.

*To all whom it may concern:*

Be it known that I, CHARLES G. KALLENSEE, a citizen of the United States, residing at Dayton, in the county of Montgomery and State of Ohio, have invented certain new and useful Improvements in Precision Gauges, Flexible Type, of which the following is a specification.

This invention relates in general to precision gauges and more particularly to a precision gauge adapted to utilize a flexible, fluid containing tube as a means of transmitting an indication of the measurement desired to an indicator at a point remote therefrom.

I am aware that it is not new to provide a precision gauge utilizing a liquid column as the means of transmitting an indication, the liquid being actuated by suitable plungers, but I believe my improvement to have certain new and useful features hitherto unknown to the art.

It is a further object of my invention to provide means for taking measurements at one point and transmitting the measurements thus taken through a flexible, fluid containing tube to a suitably disposed indicating dial.

With the above and other objects in view the invention consists in the novel construction, combination and arrangement herein fully described, illustrated and claimed.

In the accompanying drawings—

Figure 1 is an elevation, partly in section of one embodiment of my device;

Figure 2 is an elevation partly in section of the indicating gauge and operating means therefor.

Referring with greater particularity to the drawings and first having reference to Figure 1 it will be seen that my device is comprised as follows:

A substantially T-shaped gauge body 1 is provided in the arms of the T with recesses 2 and 3 and with a central bore 1ª which communicates with the recess 3. Recess 2 is interiorly threaded and is adapted to receive an adjustable ball point stud 5 the relative position of which may be fixed by the lock nut 6.

One end of the gauge body 1, as illustrated to an advantage in Figure 1, has connected therewith a housing 8 by means of the coupling union 9. A lock nut 9ª is threaded on the housing 8 and against the coupling union 9 to retain the housing 8 in adjusted positions relative to the gauge body 1. The housing 8 is provided with an extension 4 forming a piston guide, the said guide being positioned in the recess 3 in the gauge body 1. A plunger pin 7 is slidably carried in the housing 8 the same having a piston 10 on one end thereof adapted to be reciprocated in the guide 4.

The center arm 11 of the gauge body 1 has an externally screw threaded portion adapted to receive the union connection 11ª and the connection nipple 11ᵇ for connecting the gauge body to a flexible fluid tube 12. A convenient fiber grip 13 is provided for handling the gauge.

The opposite end of the flexible, fluid tube is connected to an indicating gauge as will now be described. A brass coupling 18 is provided with two recesses, one recess being for the reception of the shank 19 of the indicator 20 and the other for the reception of a plunger guide 14 around which is the flexible tube 12. The contact plunger guide 24 has a portion 17 adapted to fit over the end of the tube 12 and has a portion extending downwardly into the tube and adapted to act as a cylinder guide for a piston 14 which is secured to a piston pin 16. A spring 15 mounted on the piston pin 16 and interposed between the piston 14 and the upper end of the guide 24 tends to force the piston downwardly towards the seat 25 at the lower end of the guide 24. The indicator is provided with a dial 23 and an indicating hand 22 which may be operated through any suitable multiplying means, by the pin 21. The flexible fluid tube is to be completely filled with oil or some other suitable non-freezing fluid.

From the foregoing my device will be seen to operate as follows:

The adjusting pin 5 is adjusted to the dimensions desired and the lock nut 6 tightened. The gauge is then inserted into the bore to be measured. The pin 7 coming in contact with the wall of the bore being measured will force the piston 10 downwardly forcing the fluid out through the opening 1ª and forcing the piston 14 upwardly against the action of spring 15. The upper end of pin 16 will then force the pin 21 upwardly and operate the indicating hand as previously described.

It is believed that this gauge will serve as an expedient in reducing the cost of cylinder grinding, at the same time shortening periods for production quantities of work. The design gives variations of measurements in decimal of an inch, thus enabling the operator at all times to know with what degree of accuracy his work is being done. Adjustments which the gauge or contact end is provided with, enable it to be readily adjusted so that the dial will read at zero point, also adjusting for diameter when used for cylindrical work. It is further believed that the most accurate and quickest working gauge for cylinder work is provided. The gauge results in a saving of nine-tenths of the time of any other gauge. The gauge is essential for large boring and extreme lengths, which are to be worked to exact measurements and in which by other means these variations would be difficult to obtain. The gauge is readily adaptable and can be transferred from one machine to another in a few minutes, being a utility part, in a sense, to machine shop practice.

I claim—

1. In a precision measuring instrument, a contact member including a piston, an indicating means including a piston, and a flexible tube containing fluid for transmitting the motion of said first piston operated by said contact member to said second piston.

2. In a precision measuring instrument, in combination, a gauge body, a ball pin plunger mounted in said body, a piston mounted on said plunger and adapted to reciprocate with said plunger, a piston guide within said body, indicating means, a flexible tube fluid in said tube said tube operatively connecting said gauge body to said indicating means, and a resiliently mounted piston adapted to operate said indicating means.

3. In a precision measuring instrument, a contact means including a piston, an indicating means including a resiliently mounted piston operated element, and a flexible tube containing fluid for transmitting the motion of said piston to said piston operated element.

4. In a precision measuring instrument, a contact means including a piston, an indicating means including a piston operated element, a flexible tube containing fluid for transmitting the motion of said piston to said first piston operated element, and means for adjusting said contact means.

In testimony whereof I affix my signature.

CHARLES G. KALLENSEE.